Nov. 19, 1957  G. DYURICZA  2,813,600
COMBINATION AUTO WHEEL BLOCK AND DOOR MAT
Filed Aug. 30, 1955
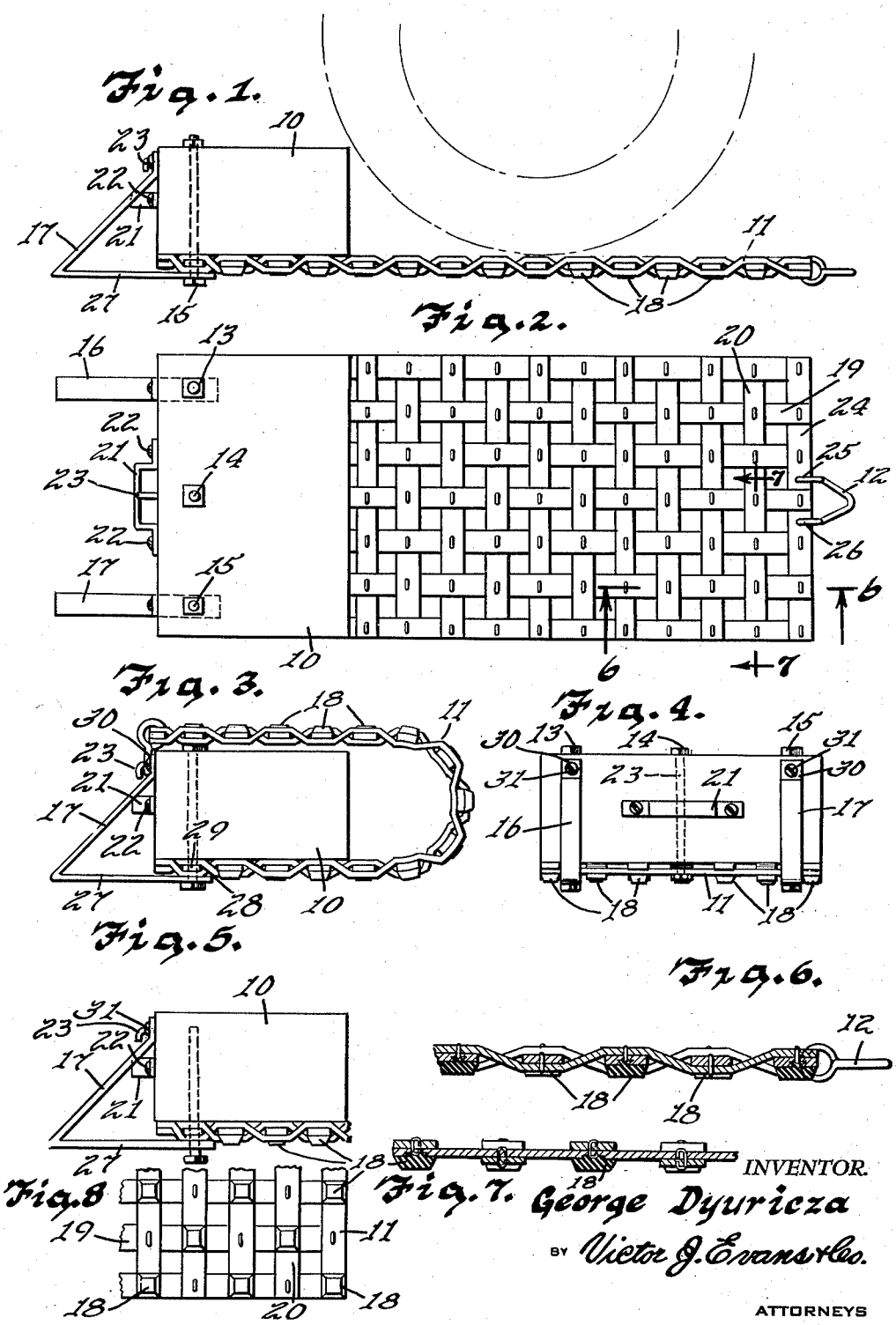
INVENTOR.
George Dyuricza
BY Victor J. Evans & Co.
ATTORNEYS

United States Patent Office 2,813,600
Patented Nov. 19, 1957

2,813,600

COMBINATION AUTO WHEEL BLOCK AND DOOR MAT

George Dyuricza, Farrell, Pa.

Application August 30, 1955, Serial No. 531,395

1 Claim. (Cl. 188—32)

This invention relates to blocking devices used particularly with motor vehicles and other devices wherein a wheel rolls upon a portion of the device, and in particular, a substantially rectangular shaped block with a mat of woven material secured to the under surface and extended therefrom and also with triangular shaped braces mounted on and extended from the side of the block opposite to that from which the mat extends.

The purpose of this invention is to provide a block for stopping and retaining motor vehicles, particularly upon inclined surfaces, wherein it is desired to spot and locate vehicles in crowded areas, such as sales rooms and garages, wherein a wheel rolls upon a portion of the device positively preventing the block being removed, such as by small children, and releasing the vehicle.

Various types of wheel blocks have been provided particularly for use in preventing a vehicle rolling while changing a tire or with the vehicle parked on a sloping surface, however, such devices are often accidentally displaced or are removed by irresponsible persons whereby vehicles are released and individuals and property are damaged. With this thought in mind, this invention contemplates a block having a flexible mat attached thereto whereby with the wheel of a vehicle rolled upon the mat the block is anchored in position and can only be removed by operating the vehicle.

The object of this invention is, therefore, to provide an improved wheel block for motor vehicles wherein a wheel is adapted to roll upon an extended portion of the block to prevent accidental removal of the block.

Another object of the invention is to provide a combination wheel block and mat in which the mat is adapted to be removed from the block and used independently.

A further object of the invention is to provide a combination wheel block and mat in which the device is of a simple and economical construction.

With these and other objects and advantages in view, the invention embodies a block having a mat of woven material extended therefrom and having triangular shaped braces extended from a side opposite to that from which the mat extends.

Other features and advantages of the invention will appear from the following description, taken in connection with the drawing, wherein:

Figure 1 is a side elevational view showing the improved combination block with the parts in extended positions for use.

Figure 2 is a plan view of the wheel block with the parts in positions as shown in Figure 1.

Figure 3 is an end elevational view of the improved wheel block showing the mat folded over and with the extended end attached to the block to facilitate carrying the block from one position to another.

Figure 4 is a front elevational view of the improved wheel block looking toward the end upon which the diagonal braces and handle are positioned.

Figure 5 is an end elevational view of the block with the extended portion of the mat broken away.

Figure 6 is a longitudinal section through a portion of the mat, taken on line 6—6 of Figure 2, illustrating the construction thereof.

Figure 7 is a cross section through a portion of the mat, taken on line 7—7 of Figure 2, showing the alternate positions of rubber blocks secured to bands of the mat.

Figure 8 is a view looking upwardly toward the under surface of the mat showing one corner thereof and illustrating the relative positions of the blocks of resilient material on the under surface of the mat.

Referring now to the drawing, wherein like reference characters denote corresponding parts, the improved wheel block and mat of this invention includes a substantially rectangular shaped block 10, a mat 11 having a bail or loop 12 on the extended end and secured by bolts 13, 14 and 15 to the block 10, braces 16 and 17 extended from the side of the block opposite to that from which the mat extends, blocks or pads of rubber or other resilient material, as indicated by the numeral 18, positioned on under surfaces of interwoven bands 19 and 20 of the mat, a handle 21 secured by bolts 22 to the side of the block opposite to that from which the mat extends and a hook 23 also extended from the side of the block opposite to that from which the mat extends and positioned to receive the loop 12 for retaining the mat in a folded position, as shown in Figure 3.

Although it is preferred to make the block 10 of wood, it will be understood that other suitable material may be used, and although it is preferred to make the bands or strips 19 and 20 of spring steel, it will also be understood that other suitable material may be used. The bands 19 and 20 may also be woven in different patterns or flexibly connected by other suitable means.

The bail or loop 12 extends from the end of the mat and, as shown in Figure 2, ends of the loop are secured to an end band, as indicated by the numeral 24, by welding, such as at the points 25 and 26, or by other means. In folding the mat, the loop 12 is placed over the hook 23 on the opposite side of the block whereby the mat is retained in the position shown in Figure 3.

The brackets 16 and 17 are formed with horizontally disposed base sections 27 through the ends of which the bolts 13, 14 and 15 extend and, as illustrated in Figure 3, the extended ends of the sections 27 are provided with projections 28 that extend over a steel band 29 extended across the inner end of the mat. The upwardly sloping portions or inclined sections of the brackets 16 and 17 which are positioned at acute angles in relation to the base portions are provided with flanges 30 through which screws or other fasteners, as indicated by the numeral 31, extend to secure upper ends of the brackets to the block 10.

With the parts formed as illustrated and described, the block with the mat thereon is adapted to be positioned so that a wheel rolling upon the mat engages the block to limit travel of the wheel and with the wheel positioned upon the mat it is impossible to remove the block without rolling the wheel from the mat. By this means the block is adapted to be used for placing vehicles, such as in garages and salesrooms, as with the block in position a wheel rolled thereon may be stopped at a suitable point making sure stopping possible. Cars may, therefore, be spotted with positions thereof definitely located and cars may be brought to desired positions with ease without damage to the vehicles or the garage walls. The device is, therefore, a time saver and in accurately positioning vehicles in garages and salesrooms the device makes it possible to accommodate a greater number of vehicles in the same area. The device is not only adapted for passengers or pleasure vehicles as it may also be used for trucks, trailers, and other types of vehicles.

With the mat folded as illustrated in Figure 3, the device is adapted to be carried from one position to another and with the mat removed from the block by removing the bolts 13, 14 and 15 the mat is adapted to be used as a door mat or the like.

It will be understood that modifications, within the scope of the appended claim, may be made in the design and arrangement of the parts without departing from the spirit of the invention.

What is claimed is:

In a device of the character described, a rectangular shaped block, a mat of woven strips having pads of resilient material on the under surface thereof extended from one side of the block, bolts extended through the mat and block for temporarily securing the mat to the block, spaced triangular shaped brackets mounted on the block and extended from the side opposite to that from which the mat extends, said brackets including horizontally disposed base sections through the ends of which the bolts extend, the extended ends of the base sections being provided with projections that extend contiguous to a band which is arranged adjacent an end of the mat, said brackets including upwardly sloping portions which are arranged angularly with respect to the base sections and wherein said upwardly sloping portions are provided with flanges that are secured to said block, a handle secured to the side of the block opposite to that from which the mat extends, a hook mounted on the block and also extended from the side of the block opposite to that from which the mat extends, and a loop on the end of the mat opposite that end of the mat which is connected to the block, and said loop adapted to be placed over the hook of the block for retaining the mat in folded position.

References Cited in the file of this patent
UNITED STATES PATENTS

| | | |
|---|---|---|
| 1,422,646 | Winters | July 11, 1922 |
| 1,912,038 | Irish | May 30, 1933 |
| 2,143,553 | Hamaguchi | Jan. 10, 1939 |
| 2,746,570 | Stahmer | May 22, 1956 |
| 2,746,571 | Taylor | May 22, 1956 |